(12) United States Patent
Miyake et al.

(10) Patent No.: US 12,123,732 B2
(45) Date of Patent: Oct. 22, 2024

(54) GUIDE INFORMATION PROCESSING APPARATUS, GUIDE INFORMATION PROCESSING METHOD AND PROGRAM

(71) Applicant: NIPPON TELEGRAPH AND TELEPHONE CORPORATION, Tokyo (JP)

(72) Inventors: Asuka Miyake, Musashino (JP); Misa Hirao, Musashino (JP); Hiroya Minami, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 371 days.

(21) Appl. No.: 17/596,463

(22) PCT Filed: Jun. 26, 2019

(86) PCT No.: PCT/JP2019/025295
§ 371 (c)(1),
(2) Date: Dec. 10, 2021

(87) PCT Pub. No.: WO2020/261407
PCT Pub. Date: Dec. 30, 2020

(65) Prior Publication Data
US 2022/0307852 A1    Sep. 29, 2022

(51) Int. Cl.
*G01C 21/34* (2006.01)
(52) U.S. Cl.
CPC ................ *G01C 21/3484* (2013.01)
(58) Field of Classification Search
CPC .............. G01C 21/3484; G01C 21/206; G01C 21/3629; G01C 21/3641; G01C 21/3644
See application file for complete search history.

(56) References Cited

U.S. PATENT DOCUMENTS

| 10,540,877 B1* | 1/2020 | Gersten .................. G06F 9/453 |
| 2010/0100318 A1* | 4/2010 | Jung .................. G01C 21/3629 |
| | | 701/431 |

(Continued)

FOREIGN PATENT DOCUMENTS

| JP | H08-261785 | 10/1996 |
| JP | 2000-298029 | 10/2000 |

(Continued)

OTHER PUBLICATIONS

Google LLC., "Map data", Google Map, read on May 31, 2019, https://www.google.com/maps/?hl=ja.

(Continued)

*Primary Examiner* — Anne Marie Antonucci
*Assistant Examiner* — Patrick Daniel Mohl
(74) *Attorney, Agent, or Firm* — IPUSA, PLLC

(57) ABSTRACT

A guidance information processing device includes a first specifying unit that refers to a first storage unit storing position information of individual facilities, and specifies one or more of the facilities present on a route based on a designation of a user, and a second specifying unit that refers to a second storage unit storing, for each facility, information indicating a sensation capable of being experienced regarding the facility, and specifies a candidate for a sensation to be experienced by the user regarding the one or more of the facilities specified by the first specifying unit at a time of performing guidance on the route, thereby contributing to generation of guidance information suitable for the user.

6 Claims, 13 Drawing Sheets

(56) References Cited

U.S. PATENT DOCUMENTS

| | | | | |
|---|---|---|---|---|
| 2011/0054786 A1* | 3/2011 | Kim | ............ | G01C 21/3655 |
| | | | | 701/533 |
| 2014/0310739 A1* | 10/2014 | Ricci | ............ | G06F 16/183 |
| | | | | 725/75 |
| 2014/0379251 A1* | 12/2014 | Tolstedt | ............ | G01C 21/206 |
| | | | | 701/410 |
| 2015/0324646 A1* | 11/2015 | Kimia | ............ | G01C 21/3602 |
| 2016/0131486 A1* | 5/2016 | Hendrix | ............ | G01C 21/206 |
| | | | | 701/525 |
| 2018/0053231 A1* | 2/2018 | Clark | ............ | G06K 7/10386 |
| 2018/0053394 A1* | 2/2018 | Gersten | ............ | G08B 17/08 |
| 2020/0064141 A1* | 2/2020 | Bell | ............ | G09B 21/006 |

FOREIGN PATENT DOCUMENTS

| | | |
|---|---|---|
| JP | 2001-349739 | 12/2001 |
| JP | 2003-006219 | 1/2003 |

OTHER PUBLICATIONS

Zenrin DataCom Co., Ltd., "Zenrin map", Always NAVI, read on May 31, 2019, https://www.its-mo.com/.

* cited by examiner

| NODE | LATITUDE AND LONGITUDE | TURNING DIRECTION | DISTANCE TO NEXT NODE | GRADIENT TO NEXT NODE | FLOOR MOVEMENT TO NEXT NODE |
|---|---|---|---|---|---|
| NODE 1 (EXIT 1 OF STATION A) | 35.6582,139.7457 | - | 150m | 0% | 0 |
| NODE 2 | 35.6582,139.7459 | RIGHT | 200m | 2% | +1 |
| NODE 3 | 35.6582,139.7461 | LEFT | 300m | 0% | 0 |
| NODE 4 (TOWER X) | 35.6582,139.7463 | - | - | 0% | 0 |

Fig. 5

| FACILITY NAME | LATITUDE AND LONGITUDE | CATEGORY |
|---|---|---|
| STAIRS | 35.6582,139.7457 | - |
| BRAILLE BLOCK | 35.6582,139.7458 | - |
| SLOPE | 35.6582,139.7459 | - |
| STEP | 35.6582,139.7460 | - |
| SOUND SIGN EMITTING RESTROOM | 35.6582,139.7461 | - |
| ESCALATOR | 35.6582,139.7462 | - |
| ELEVATOR | 35.6582,139.7463 | - |
| WALL | 35.6582,139.7463 | - |
| AUTOMATIC DOOR | 35.6582,139.7465 | - |
| CAFE X | 35.6582,139.7464 | RESTAURANT |
| CURRY RESTAURANT X | 35.6582,139.7465 | RESTAURANT |
| SHOE SHOP X | 35.6582,139.7466 | CLOTHING SHOP |
| SOUND GUIDANCE | 35.6582,139.7467 | - |
| ... | ... | ... |

Fig. 6

| FACILITY NAME | LATITUDE AND LONGITUDE | CATEGORY | RIGHT AND LEFT | ORIENTATION |
|---|---|---|---|---|
| CAFE X | 35.6582,139.7464 | RESTAURANT | LEFT | - |
| ESCALATOR | 35.6582,139.7462 | - | LEFT | - |
| SLOPE | 35.6582,139.7459 | - | CENTER | UP |
| SHOE SHOP X | 35.6582,139.7466 | CLOTHING SHOP | RIGHT | - |
| SOUND SIGN EMITTING RESTROOM | 35.6582,139.7461 | - | LEFT | - |

Fig. 7

| NODE/ FACILITY NAME | LATITUDE AND LONGITUDE | TURNING DIRECTION | DISTANCE TO NEXT NODE | GRADIENT TO NEXT NODE | FLOOR MOVEMENT TO NEXT NODE | CATEGORY | RIGHT AND LEFT | ORIENTATION |
|---|---|---|---|---|---|---|---|---|
| NODE 1 (EXIT 1 OF STATION A) | 35.6582, 139.7457 | – | 150 | 0% | 0 | – | – | – |
| CAFE X | 35.6582, 139.7458 | – | 100 | – | – | RESTAURANT | LEFT | – |
| ESCALATOR | 35.6582, 139.7459 | – | 50 | – | – | – | LEFT | – |
| NODE 2 | 35.6582, 139.7463 | RIGHT | 200 | 2% | +1 | – | – | – |
| SLOPE | 35.6582, 139.7467 | – | 100 | – | – | – | CENTER | UP |
| NODE 3 | 35.6582, 139.7468 | LEFT | 300 | 0% | 0 | – | – | – |
| SHOE SHOP X | 35.6582, 139.7469 | – | 200 | – | – | CLOTHING SHOP | RIGHT | – |
| SOUND SIGN EMITTING RESTROOM | 35.6582, 139.7470 | – | 100 | – | – | – | LEFT | – |
| NODE 4 (TOWER X) | 35.6582, 139.7471 | – | 0 | 0% | 0 | – | – | – |

Fig. 8

(r1) ALL NODES → IMPART VISUAL SENSATION (r2) NODE HAVING VALUE OF "TURNING DIRECTION" → IMPART FORCE SENSATION (r3) NODE IN WHICH "GRADIENT TO NEXT NODE" IS NOT 0% OR NODE HAS CHANGE IN VALUE FROM NODE IMMEDIATELY BEFORE → IMPART FORCE SENSATION (r4) NODE IN WHICH "FLOOR MOVEMENT TO NEXT NODE" IS NOT ZERO → IMPART FORCE SENSATION

Fig. 9

| FACILITY NAME | PRESENTABLE MODALITY |
|---|---|
| STAIRS | VISUAL SENSATION, HEARING SENSATION, TACTILE SENSATION, FORCE SENSATION |
| BRAILLE BLOCK | VISUAL SENSATION, HEARING SENSATION, TACTILE SENSATION |
| SLOPE | VISUAL SENSATION, HEARING SENSATION, TACTILE SENSATION, FORCE SENSATION |
| STEP | VISUAL SENSATION, HEARING SENSATION, TACTILE SENSATION |
| SOUND SIGN EMITTING RESTROOM | VISUAL SENSATION, HEARING SENSATION |
| ESCALATOR | VISUAL SENSATION, HEARING SENSATION, TACTILE SENSATION, FORCE SENSATION |
| ELEVATOR | VISUAL SENSATION, HEARING SENSATION, TACTILE SENSATION, FORCE SENSATION |
| WALL | VISUAL SENSATION, HEARING SENSATION, TACTILE SENSATION |
| AUTOMATIC DOOR | VISUAL SENSATION, HEARING SENSATION |
| CAFE X | VISUAL SENSATION, OLFACTORY SENSATION, TASTE SENSATION |
| CURRY RESTAURANT X | VISUAL SENSATION, OLFACTORY SENSATION, TASTE SENSATION |
| SHOE SHOP X | VISUAL SENSATION |
| SOUND GUIDANCE | HEARING SENSATION |
| ... | ... |

Fig. 10

| NODE/ FACILITY NAME | LATITUDE AND LONGITUDE | TURNING DIRECTION | DISTANCE TO NEXT NODE | GRADIENT TO NEXT NODE | FLOOR MOVEMENT TO NEXT NODE | CATEGORY | RIGHT AND LEFT | ORIENTATION | PRESENTABLE MODALITY ATTRIBUTE |
|---|---|---|---|---|---|---|---|---|---|
| NODE 1 (EXIT 1 OF STATION A) | 35.6582, 139.7457 | - | 150 | 0% | 0 | - | - | - | VISUAL SENSATION |
| CAFE X | 35.6582, 139.7458 | - | 100 | - | - | RESTAURANT | LEFT | - | VISUAL SENSATION, OLFACTORY SENSATION, TASTE SENSATION |
| ESCALATOR | 35.6582, 139.7459 | - | 50 | - | - | - | LEFT | - | VISUAL SENSATION, HEARING SENSATION, TACTILE SENSATION, FORCE SENSATION |
| NODE 2 | 35.6582, 139.7463 | RIGHT | 200 | 2% | +1 | - | - | - | VISUAL SENSATION, FORCE SENSATION |
| SLOPE | 35.6582, 139.7467 | - | 100 | - | - | - | CENTER | UP | VISUAL SENSATION, HEARING SENSATION, TACTILE SENSATION, FORCE SENSATION |
| NODE 3 | 35.6582, 139.7468 | LEFT | 300 | 0% | 0 | - | - | - | VISUAL SENSATION, FORCE SENSATION |
| SHOE SHOP X | 35.6582, 139.7469 | - | 200 | - | - | CLOTHING SHOP | RIGHT | - | VISUAL SENSATION |
| SOUND SIGN EMITTING RESTROOM | 35.6582, 139.7470 | - | 100 | - | - | - | LEFT | - | VISUAL SENSATION, HEARING SENSATION |
| NODE 4 (TOWER X) | 35.6582, 139.7471 | - | 0 | 0% | 0 | - | - | - | VISUAL SENSATION |

Fig. 11

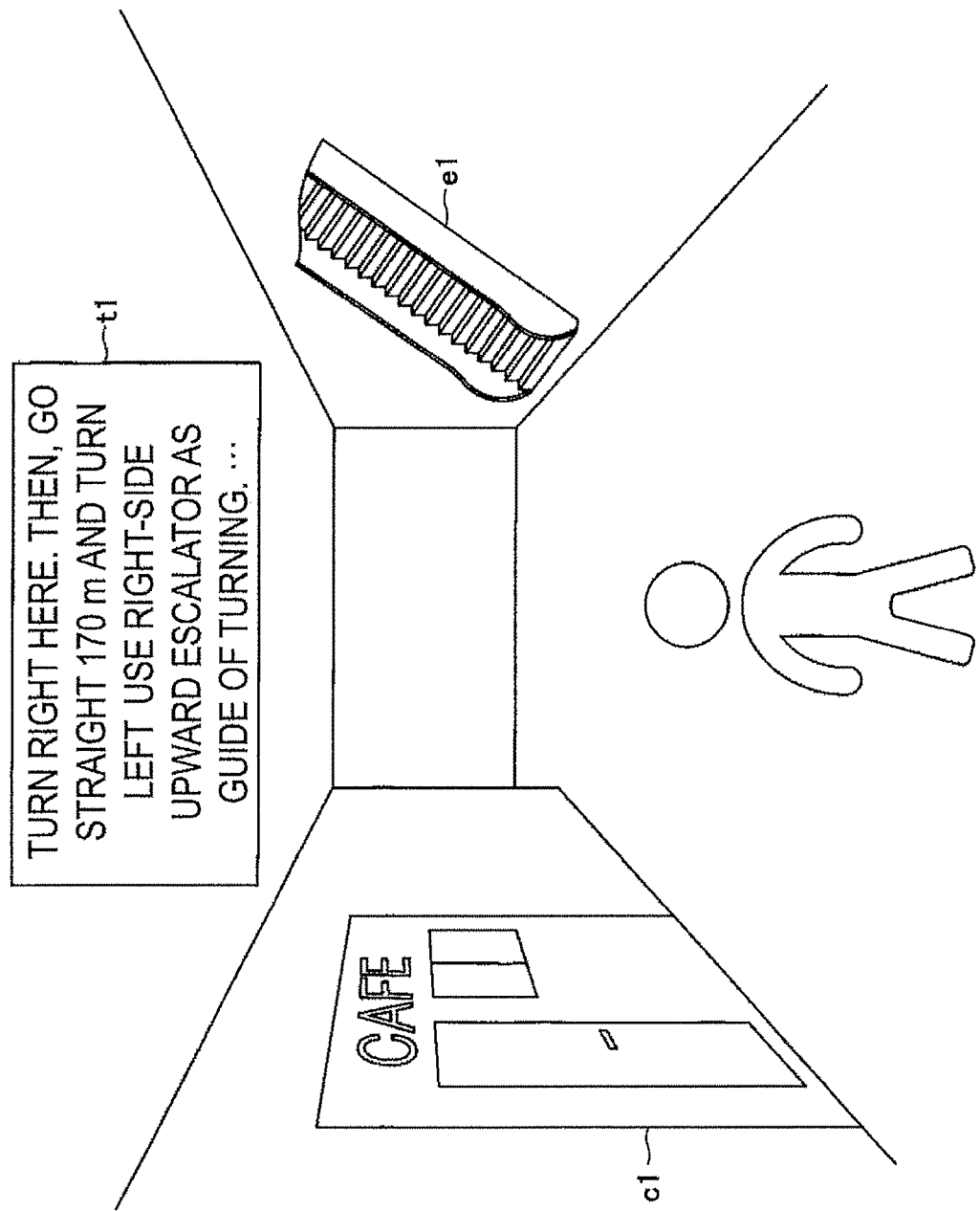

GUIDE INFORMATION PROCESSING APPARATUS, GUIDE INFORMATION PROCESSING METHOD AND PROGRAM

TECHNICAL FIELD

The present invention relates to a guidance information processing device, a guidance information processing method, and a program.

BACKGROUND ART

In the related art, a system that presents information for guidance to a destination based on map information has been proposed. For example, in a technology described in Patent Literature 1, guidance information such as directions to a destination is presented to a user based on information on a landmark which is easy for the user to recognize, thereby allowing the user to readily understand to which a place the user should walk.

Further, a technology that enables information used for generation of guidance information such as directions to a destination to be selected, for example, by setting various attributes in map information has been proposed. For example, in Non Patent Literature 1, attributes such as categories of facilities, related websites, telephone numbers, business hours, and user reviews, in addition to names, photographs, and addresses of landmarks are included in map information. In Non Patent Literature 2, attributes such as a distance from a nearest station are also included in the map information.

CITATION LIST

Patent Literature

Patent Literature 1: JP 2000-298029 A

Non Patent Literature

Non Patent Literature 1: Internet <URL: https://www.google.com/maps/?hl=ja>
Non Patent Literature 2: Internet <URL: https://www.its-mo.com/>

SUMMARY OF THE INVENTION

Technical Problem

In Non Patent Literature 1 and 2, it is possible to perform processing such as presenting only a landmark having a specific value for a specific attribute to a user when including various attributes in the map information.

On the other hand, although the information which can be used by a user and information which is easy to understand differ depending on the types of disabilities of users, spatial cognitive characteristics, ways of memorization that users are good at, or the like, at present, attributes such as whether the map information is to be presented visually, is to be presented visually audibly, or is to be presented visually and tactilely are not able to be set when guidance information such as directions to a destination is generated based on map information.

The present invention has been made in view of the above points, and an object of the present invention is to contribute to generation of guidance information suitable for a user.

Means for Solving the Problem

Thus, in order to solve the above problems, a guidance information processing device includes a first specifying unit configured to refer to a first storage unit storing position information of individual facilities, and specify one or more of the facilities present on a route based on a designation of a user; and a second specifying unit configured to refer to a second storage unit storing, for each facility, information indicating a sensation capable of being experienced regarding the facility, and specify a candidate for a sensation to be experienced by the user regarding the one or more of the facilities specified by the first specifying unit at a time of performing guidance on the route.

Effects of the Invention

It is possible to contribute to the generation of the guidance information suitable for a user.

BRIEF DESCRIPTION OF DRAWINGS

FIG. 5 is a diagram illustrating an example of route information.
FIG. 6 is a diagram illustrating a configuration example of a facility information storage unit 122.
FIG. 7 is a diagram illustrating an example of results of acquiring facility information.
FIG. 8 is a diagram illustrating an example of a waypoint list.
FIG. 9 is a diagram illustrating an example of rule information for node information.
FIG. 10 is a diagram illustrating an example of rule information for facility information.
FIG. 11 is a diagram illustrating an example of a waypoint list in which a presentable modality attribute is imparted.
FIG. 12 is a diagram illustrating a first presentation example of guidance information.

DESCRIPTION OF EMBODIMENTS

Figure 1:
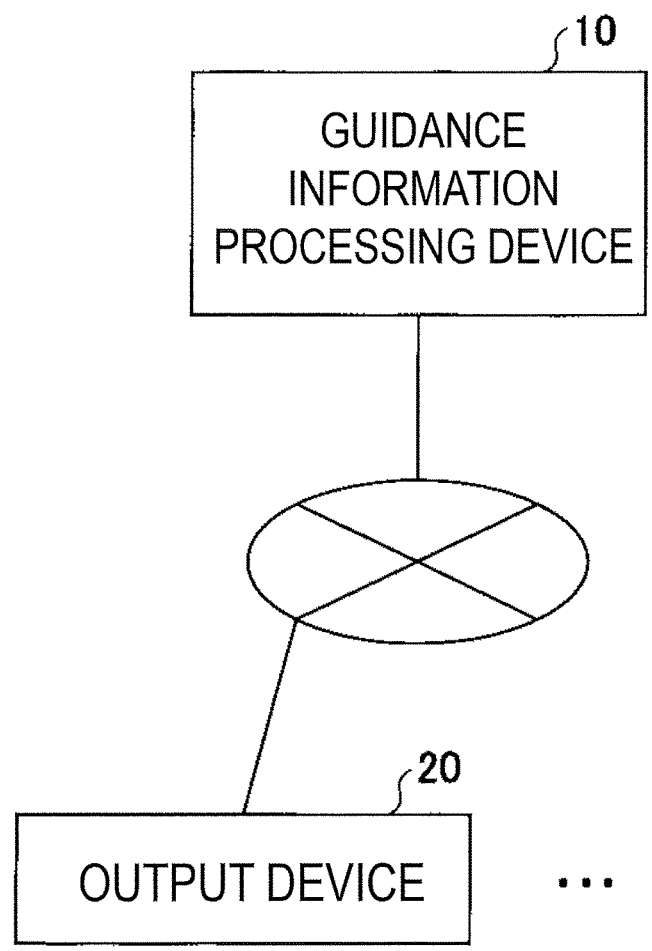
FIG. 1 is a diagram illustrating an example of a system configuration in an embodiment of the present invention.

Hereinafter, embodiments of the present invention will be described with reference to the drawings. FIG. 1 is a diagram illustrating an example of a system configuration according to an embodiment of the present invention. In FIG. 1, a guidance information processing device 10 and one or more output devices 20 are connected to each other via a network such as the Internet.

The output device 20 is a device that receives input information from a user or outputs information based on information that is generated by the guidance information processing device 10 based on the input information. Examples of a simple output device 20 include a smartphone and a personal computer (PC), but the output device 20 may be configured of a plurality of devices capable of outputting a sensation or information that can be perceived through the five human sensations (sensation modality), such as a liquid crystal display, a force sensation display, an olfactory display, or a speaker. For example, when the output device 20 is a portable device such as a smartphone, the user can use the output device 20 at any place. On the other hand, when the output device 20 is fixed in the home of a user or at a predetermined place (for example, a place provided for outputting the information generated by the guidance information processing device 10 effectively), the user can use the output device 20 at home or the predetermined place. The predetermined place may include an attraction such as an amusement park.

The guidance information processing device 10 is one or more computers that generate information requested by the user (from the output device 20) in a format according to characteristics of information understanding of the user. In the present embodiment, an example in which a departure place and a destination are input to the output device 20 by the user, and guidance information on a route from the departure place to the destination is generated by the guidance information processing device 10 will be described.

Figure 2:
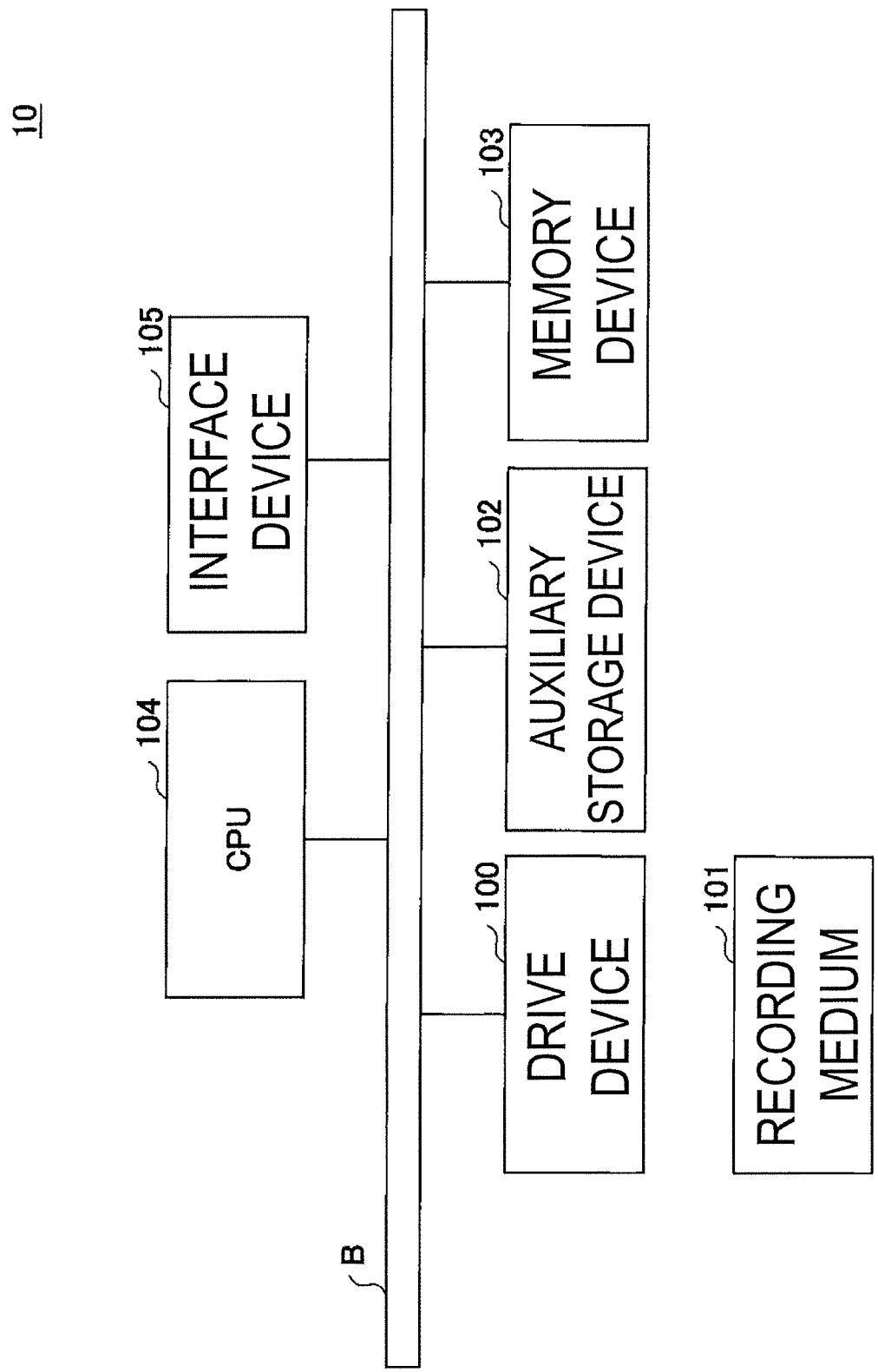
FIG. 2 is a diagram illustrating a hardware configuration example of a guidance information processing device 10 in the embodiment of the present invention.

FIG. 2 is a diagram illustrating a hardware configuration example of the guidance information processing device 10 in the embodiment of the present invention. The guidance information processing device 10 in FIG. 2 includes, for example, a drive device 100, an auxiliary storage device 102, a memory device 103, a CPU 104, and an interface device 105, which are connected to each other by a bus B.

A program that realizes processing in the guidance information processing device 10 is provided by a recording medium 101 such as a CD-ROM. When the recording medium 101 storing the program is set in the drive device 100, the program is installed in the auxiliary storage device 102 from the recording medium 101 via the drive device 100. However, the program does not necessarily have to be installed from the recording medium 101, and may be downloaded from another computer via a network. The auxiliary storage device 102 stores the installed program and also stores necessary files, data, and the like.

The memory device 103 reads and stores the program from the auxiliary storage device 102 when there is an instruction to start the program. The CPU 104 executes a function relevant to the guidance information processing device 10 according to the program stored in the memory device 103. The interface device 105 is used as an interface for connection to a network.

Figure 3:
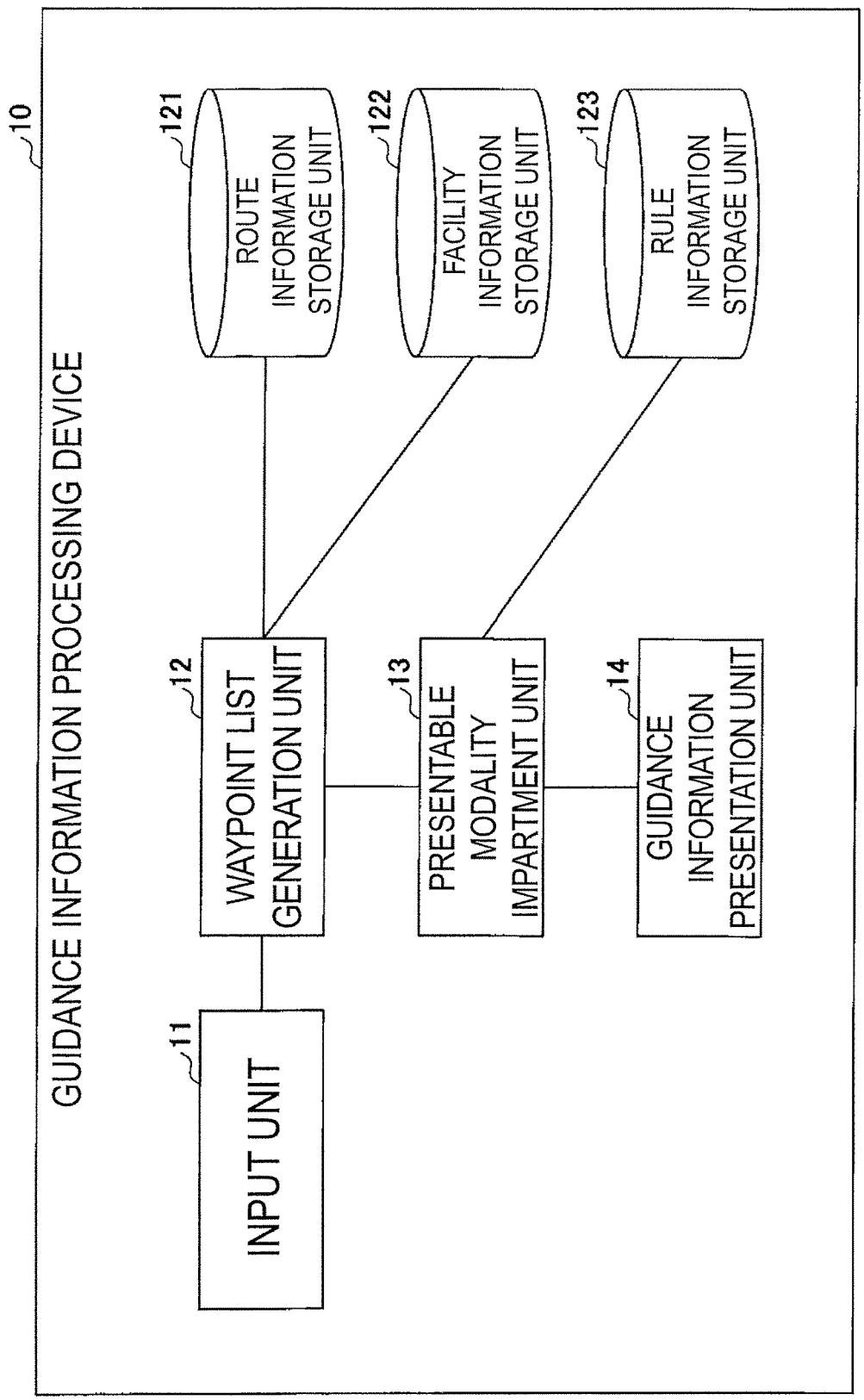
FIG. 3 is a diagram illustrating a functional configuration example of the guidance information processing device 10 in the embodiment of the present invention.

FIG. 3 is a diagram illustrating a functional configuration example of the guidance information processing device 10 according to the embodiment of the present invention. In FIG. 3, the guidance information processing device 10 includes an input unit 11, a waypoint list generation unit 12, a presentable modality impartment unit 13, a guidance information presentation unit 14, and the like. Each of these units is realized by a process of causing the CPU 104 to execute one or more programs installed in the guidance information processing device 10. The guidance information processing device 10 also uses a route information storage unit 121, a facility information storage unit 122, and a rule information storage unit 123. Each of these storage units can be realized by using, for example, the auxiliary storage device 102 or a storage device that can be connected to the guidance information processing device 10 via the network.

Figure 4:
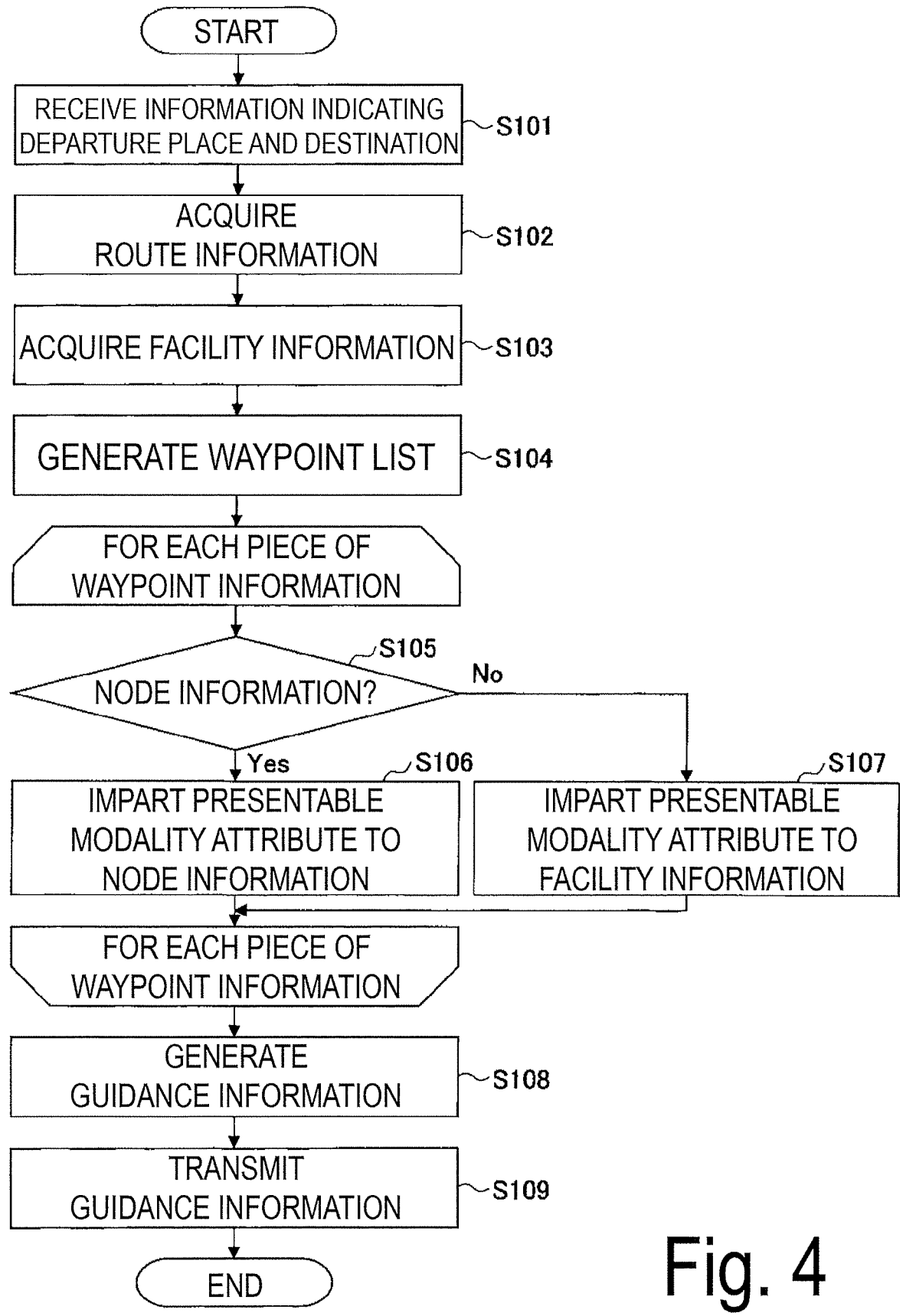
FIG. 4 is a flowchart illustrating an example of a processing procedure that is executed by the guidance information processing device 10.

Hereinafter, a processing procedure that is executed by the guidance information processing device 10 will be described. FIG. 4 is a flowchart illustrating an example of the processing procedure that executed by the guidance information processing device 10.

In step S101, the input unit 11 receives (accepts) information indicating the departure place and the destination from the output device 20. The input unit 11 outputs the input information to the waypoint list generation unit 12. The information is information input (designated) to the output device 20 by the user. The departure place and the destination are input for various purposes by the user. For example, real-time route guidance (navigation) from a current place may be the purpose, route preparation for an outing a few days later may be the purpose, or mere interest may be the purpose.

Subsequently, the waypoint list generation unit 12 receives information indicating the departure place and the destination output from the input unit 11, and acquires route information matching the information (hereinafter referred to as "target route information") from the route information storage unit 121 (S102).

FIG. 5 is a diagram illustrating an example of the route information. As illustrated in FIG. 5, the route information is information in which a route from a certain point to a certain point is expressed by a plurality of nodes and links connecting the nodes. The nodes are points that are necessary to express the route as a set of line segments, and a point selected as a node may differ depending on how accurately the route is expressed. For example, when a route between a certain point and a certain point is a substantially straight route, no nodes may be provided between the two points. On the other hand, when a curved route is included between a certain point and a certain point, nodes necessary for expressing the curve may be provided between the two nodes. That is, a node is not necessarily an existing facility or the like, but a point set for convenience in order to express a route, unlike a point of interest (POI) to be described below.

The route information illustrated in FIG. 5 is an example of route information that is acquired when the departure place is "exit 1 of station A" and the destination is "tower X" (that is, an example of the target route information).

Specifically, the route information includes node information of each node in order of the nodes passing from the departure place to the destination. The node information includes attributes such as "latitude and longitude", "turning direction", "distance to next node", "gradient to next node", and "floor movement to next node". However, more attributes may be included in the node information. In the route information, first node information corresponds to the departure place, and last node information corresponds to the destination.

A "latitude and longitude" of a certain node is position information (latitude and longitude) of a point corresponding to the node. A "turning direction" of a certain node is a turning direction when viewed from the user at the node (point). A "distance to next node" of a certain node is a distance to a node next after that node (hereinafter, simply referred to as "a next node") on the route. A "gradient to next node" of a certain node is a gradient from that node to the next node. A "floor movement to next node" of a certain node is information indicating the number of floors in a floor movement when a movement between floors of a building is included between the node and the next node. 0 indicates that there is no movement between the floors. A value to which a positive sign (+) has been imparted indicates that there is a floor movement corresponding to the value in an upward direction. A value to which a negative sign (−) has been imparted indicates that there is a floor movement corresponding to the value in a downward direction.

Information from which route information as illustrated in FIG. 5 can be acquired by inputting a certain two points may be stored in the route information storage unit 121. For example, information similar to map information of a navigation system may be stored. In this case, the waypoint list generation unit 12 may search for a route from the departure place to the destination in the map information and generate route information indicating the found route.

Subsequently, the waypoint list generation unit 12 specifies facilities located on a roadside of the route indicated by the target route information or on the target route by referring to the facility information storage unit 122, and acquires information on the specified facility (a facility passed by on the target route) from the facility information storage unit 122 (S103). The route indicated by the target route information is hereinafter referred to as a "target route". The information on the specified facility is hereinafter referred to as "facility information".

FIG. 6 is a diagram illustrating a configuration example of the facility information storage unit 122. As illustrated in FIG. 6, the facility information storage unit 122 stores a "facility name", a "latitude and longitude", a "category", and the like for each facility. However, more attributes may be included in the facility information.

A "facility name" of a certain facility is a name of the facility. The name may be a general name or may be a unique name such as a specific store name. A "latitude and longitude" of a certain facility is position information (latitude and longitude) of the facility. The "category" is an attribute that is particularly effective for a facility that is a store or facility, and is a category to which the facility belongs. The facility may be an object registered as point of interest (POI) in a navigation system.

For example, the waypoint list generation unit 12 may specify a facility on or along the target route based on a value of the "latitude and longitude" of each facility and the target route information, and acquire the facility information of the facility in the facility information storage unit 122. The waypoint list generation unit 12 aligns the respective pieces of acquired facility information in order of appearance at the time of moving along the target route from the departure place to the destination, and adds attributes "right and left" and "orientation" to each piece of facility information. The "right and left" is information indicating in which direction the facility exists at the time of moving along the target route from the departure place to the destination, and has a value of any of "left", "right", "center", and the like. The "left" means a left side, the "right" means a right side, and the "center" means a center (front). "Left and right" can be specified based on the "latitude and longitude" of the facility information and the target route. "Orientation" is an attribute that is effective for a facility that requires vertical movement, such as a stair, a step, and a slope, and is information indicating up or down.

Thus, in step S103, for example, facility information as illustrated in FIG. 7 is acquired. FIG. 7 is a diagram illustrating an example of results of acquiring facility information. In FIG. 7, an example in which five pieces of facility information have been acquired from FIG. 6 is illustrated. As described above, the facility information in FIG. 7 is aligned in order of appearance at the time of moving along the target route from the departure place to the destination, and "right and left" and "orientation" are added to each piece of facility information.

Subsequently, the waypoint list generation unit 12 generates a waypoint list based on the acquired route information (FIG. 5) and the acquired facility information (FIG. 7), and output the generated waypoint list to the presentable modality impartment unit 13 (S104).

FIG. 8 is a diagram illustrating an example of the waypoint list. The waypoint list in FIG. 8 is information in which each pieces of node information included in the route information in FIG. 5 and each piece of facility information illustrated in FIG. 5 are aligned in order of the nodes or facilities appearing at the time of moving in a direction from the departure place to the destination of the target route. Hereinafter, when a node and a facility are not distinguished, the node and the facility are referred to as "waypoint", and when node information and facility information are not distinguished, the node information and the facility information are referred to as "waypoint information". That is, the waypoint list is a list of waypoint information.

Subsequently, the presentable modality impartment unit 13 receives the waypoint list output from the waypoint list generation unit 12, and executes loop processing of steps S105 to S107 for each piece of waypoint information included in the waypoint list. Hereinafter, the waypoint information that is a processing target in the loop processing is referred to as "target waypoint information".

In step S105, the presentable modality impartment unit 13 determines whether the target waypoint information is the node information or the facility information. For example, when a character string in a format of "node N" (N is an integer) is included in a value of an item at a first column of the target waypoint information, the presentable modality impartment unit 13 may determine that the target waypoint information is the node information and, otherwise, may determine that the target waypoint information is the facility information. Alternatively, the waypoint list generation unit 12 may impart a flag indicating whether the waypoint information is the node information or the facility information, to each piece of waypoint information in the waypoint list. In this case, the presentable modality impartment unit 13 may determine whether the target waypoint information is the node information or the facility information based on the flag.

When the target waypoint information is the node information (Yes in S105), the presentable modality impartment unit 13 reads the rule information on the impartment of the presentable modality to the node information from the rule information storage unit 123, and imparts presentable modality attribute to the node information according to the rule information (S106). The node information is hereinafter referred to as "target node information". In the present embodiment, "modality" means a sensation modality. Further, the presentable modality for the node refers to a sensation (sensation modality) that can be experienced by the user regarding the node.

FIG. 9 is a diagram illustrating an example of the rule information for the node information. Rule information (r1) to (r4) are illustrated in FIG. 9.

First, because all the nodes can present the point as visual sensation information, the presentable modality impartment unit 13 imparts "visual sensation" to the target node information based on rule information (r1). That is, "visual sensation" is specified as a candidate for the sensation experienced regarding the node relevant to the target node information.

Further, because the node relevant to the target node information is a corner and information indicating turning right or left can be presented using a force sensation display or the like when the target node information has a value in the "turning direction", the presentable modality impartment unit 13 imparts "force sensation" to the target node information based on rule information (r2). That is, the "force sensation" is specified as a candidate for the sensation experienced regarding the node relevant to the target node information.

Further, when a value of "gradient to next node" of the target node information is not 0%, or when the value of "gradient to next node" of the target node information is 0%, but a value of "gradient to next node" of node information immediately before the target node information is not 0% (that is, when the value of the "gradient to the next node" of the target node information differs from the "gradient to the next node" of the node information immediately before the target node information), a slope of and an amount of change in the gradient can be presented as the force sensation at the node relevant to the target node information. Thus, the presentable modality impartment unit 13 imparts the "force sensation" to the target node information based on rule information (r3). That is, the "force sensation" is specified as a candidate for the sensation experienced regarding the node relevant to the target node information. The node information immediately before the target node information refers to last node information among node information before the target node information in the waypoint list. Thus, the facility information does not correspond to the node information.

Further, because a node relevant to the target node has a floor movement and a sensation of lifting and lowering can be presented as force sensation information when a value of "floor movement to next node" of the target node information is not 0, the presentable modality impartment unit 13 imparts the "force sensation" to the target node information based on rule information (r4). That is, the "force sensation" is specified as a candidate for the sensation experienced regarding the node relevant to the target node information.

Senses of "force sensation" imparted based on respective rules (r2) to (r4) differ. Thus, the presentable modality attribute may be imparted so that each sensation is distinguished, not simply as the "force sensation". For example, the "force sensation" imparted based on rule information (r2) is a "force sensation (right)" or a "force sensation (left)", the "force sensation" imparted based on rule information (r3) is a "force sensation (gradient)", and the "force sensation" imparted based on rule information (r4) may be a "force sensation (floor movement)".

On the other hand, when the target waypoint information is the facility information (No in S105), the presentable modality impartment unit 13 reads the rule information for the facility information from the rule information storage unit 123. The presentable modality impartment unit 13 imparts the presentable modality attribute to the facility information (hereinafter referred to as "target facility information") according to the rule information (S107).

FIG. 10 is a diagram illustrating an example of the rule information for the facility information. As illustrated in FIG. 10, the rule information for the facility information includes "presentable modality" in association with the facility name. The "presentable modality" is information indicating sensation (sensation modality) that can be experienced from the facility by the user.

For example, for stairs, an appearance thereof can be presented as visual sensation information, and a footstep at the time of going up and down the stairs can be presented as hearing sensation information. Further, a sensation of vibration at the time of going up and down or a sensation of lifting and lowering can be presented as tactile sensation information and force sensation information. Thus, in the example of FIG. 10, rule information for imparting "visual sensation", "hearing sensation", "tactile sensation", and "force sensation" to the stairs (that is, rule information indicating that it is possible to make feel "visual sensation", "hearing sensation", "tactile sensation", and "force sensation" for the stairs) is illustrated.

Further, for a sound sign emitting restroom, an appearance thereof can be presented as visual sensation information, and can also be presented as hearing sensation information because a sound sign is emitted. Thus, in the example of FIG. 10, rule information for imparting "visual sensation" and "hearing sensation" to the sound sign emitting restroom (that is, rule information indicating that it is possible to make feel "visual sensation" and "hearing sensation" for the sound sign emitting restroom) is illustrated.

Further, for a wall, an appearance thereof can be presented as visual sensation information, a degree of reverberation of a sound can be presented as hearing sensation information, and a vibration when traveling through the wall with a white cane or the like can be presented as tactile sensation information. Thus, in the example of FIG. 10, rule information for imparting "visual sensation", "hearing sensation", and "tactile sensation" to the wall (that is, rule information indicating that it is possible to make feel "visual sensation", "hearing sensation", and "tactile sensation" for the wall) is illustrated.

Further, when the category is a restaurant such as "Cafe X", an appearance thereof can be presented as visual sensation information, and an aroma and taste of coffee can be presented using an olfactory and taste display or the like. Thus, in the example of FIG. 10, rule information for imparting "visual sensation", "olfactory sensation", and "taste sensation" to "Cafe X" (that is, rule information indicating that it is possible to make feel "visual sensation", "olfactory sensation", and "taste sensation" for "Cafe X") is illustrated.

The presentable modality is not always uniquely determined. Thus, a sensation to be imparted and a way of imparting the sensation may be stored as a set. For example, when force sensation information of the gradient is present using a treadmill or the like, "sensation of rising of a gradient" and slope control information "+3 degrees" of the treadmill, for example, may be stored as a set and the set may be imparted as the presentable modality.

In step S107, the presentable modality impartment unit 13 specifies a sensation modality relevant to the presentable modality attribute associated with the facility name of the target facility information as a candidate for a sensation experienced regarding the facility relevant to the target facility information, and imparts the presentable modality attribute to the target facility information.

When the loop processing of steps S105 to S107 is executed for all pieces of the waypoint information in the waypoint list (FIG. 8), the loop processing ends. At this point in time, the presentable modality attribute has been imparted to each piece of waypoint information in the waypoint list (that is, a candidate for a sensation experienced regarding the waypoint relevant to each piece of waypoint information of the waypoint list has been specified).

FIG. 11 is a diagram illustrating an example of the waypoint list in which the presentable modality attribute has been imparted. A type of presentable modality is not limited thereto. For example, a pain sensation or a temperature sensation in addition to such sensations may be set as the presentable modality depending on a type of presentable sensation display (a type of sensation display constituting the output device 20).

The presentable modality impartment unit 13 outputs the waypoint list to which the presentable modality attribute has been imparted (hereinafter simply referred to as a "waypoint list") to the guidance information presentation unit 14.

Subsequently, the guidance information presentation unit 14 receives the waypoint list output from the presentable modality impartment unit 13 and generates guidance information based on the waypoint list (S108). The guidance information may be information indicating a position of each waypoint on a map of an area including the target route, may be information for explaining directions from the departure place to the destination of the target route in advance, or may be navigation information for presenting the directions in real time depending on a movement on the target route. The information for explaining the directions in advance refers to, for example, information for explaining the directions at a place different from the target route, such as at home.

In this case, the guidance information presentation unit 14 may select a sensation to be experienced by the user at the time of performing guidance on the target route based on the waypoint information included in the guidance information and the guidance information, based on one or more of a type of disability of the user, spatial cognitive characteristics, a way of memorization that the user is good at, and the like (hereinafter collectively referred to as "user characteristics information") and the presentable modality attribute imparted to each piece of waypoint information included in the waypoint list, and generate the guidance information that is easy for the user to understand (that is, suitable for the user). The user characteristics information may be input by the user in advance. For example, the user characteristics information may be input together with the departure place and the destination. The user characteristics information may be information indicating a sensation modality that can be experienced by the user, may be information indicating the spatial cognitive characteristics of the user, or may be information indicating a way of memorization that the user is good at.

Subsequently, the guidance information presentation unit 14 transmits the generated guidance information to the output device 20 (S109). The output device 20 presents (outputs) guidance regarding the target route based on the guidance information.

FIG. 12 is a diagram illustrating a first presentation example of the guidance information. In FIG. 12, an example in which information for explaining directions of the target route to a hearing-impaired person using visual sensation information in advance is used as the guidance information is illustrated.

In this case, the guidance information presentation unit 14 transmits information that can be visually presented, such as an image indicating a cafe c1 and an escalator e1 and an explanatory text t1 indicating directions, to the output device 20 of the user. The waypoint information to which "visual sensation" is imparted as the "presentable modality attribute" among the waypoint information included in the waypoint list is selected as an image transmission target. An image may be included in each piece of waypoint information in advance. The explanatory text t can be generated based on the waypoint list.

The output device 20 outputs the image indicating the cafe c1 and the escalator e1, the explanatory text t1 indicating the directions, and the like based on information received from the guidance information presentation unit 14. Such an image or explanatory text t1 may also be output by a display, a projector, or the like constituting the output device 20. Because FIG. 12 illustrates an example of explaining the directions in advance, the explanatory text t1 changes depending on the directions over time, and the output image may change depending on the change in the explanatory text t1.

Figure 13:
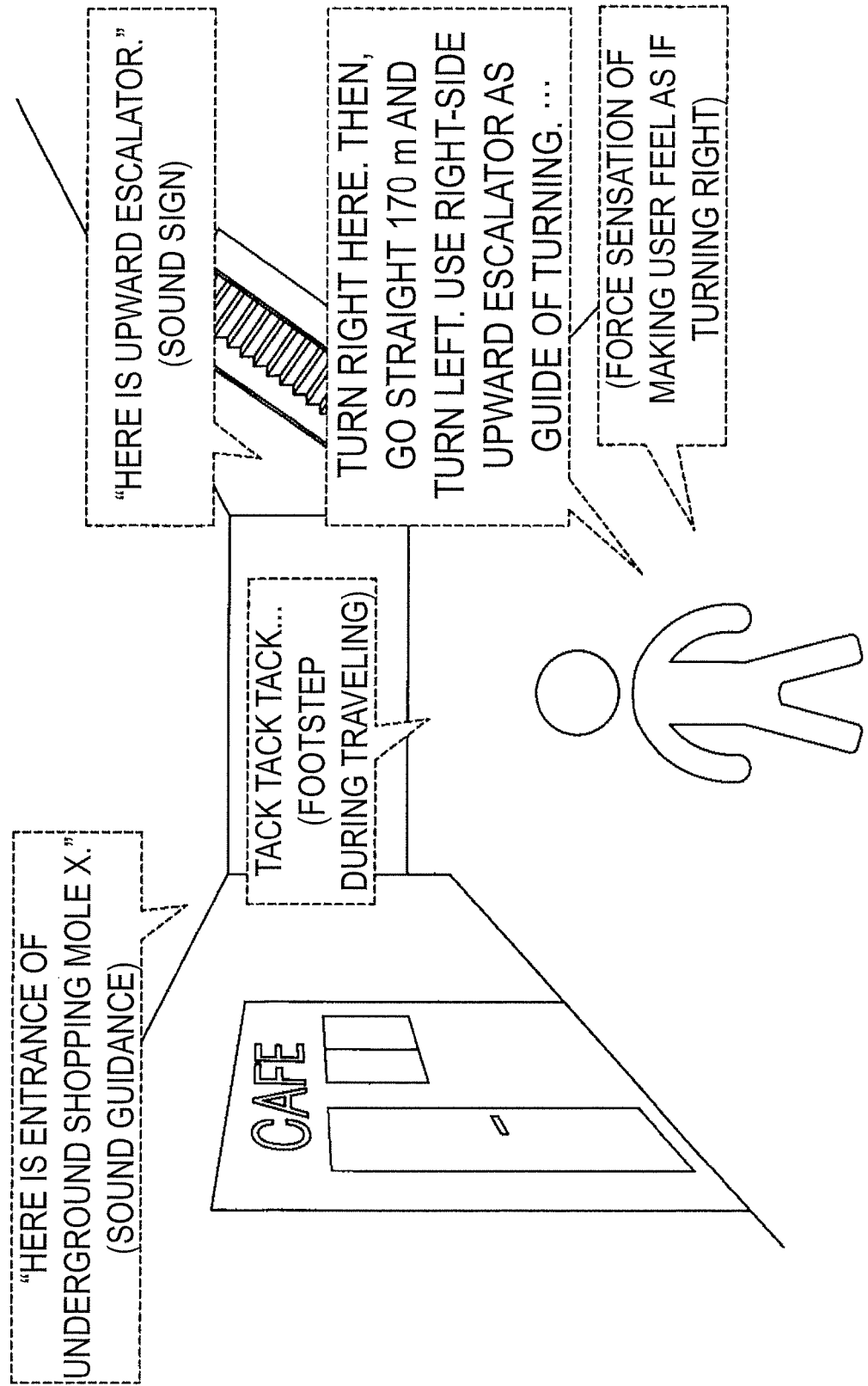
FIG. 13 is a diagram illustrating a second presentation example of guidance information.

FIG. 13 is a diagram illustrating a second presentation example of the guidance information. In FIG. 13, an example in which information for explaining directions of the target route to a visually impaired person using the hearing sensation information and the tactile sensation information in advance is used as the guidance information is illustrated.

In this case, the guidance information presentation unit 14 transmits audibly or tactilely presentable information to the output device 20 of the user. For example, the guidance information presentation unit 14 transmits sound data corresponding to each facility, an output command of a force sensation to turn to right, sound data of an explanation indicating the directions of the output route, and the like to the output device 20. A target of transmission of the sound data or a tactile or force sensation output command is waypoint information in which "hearing sensation", "tactile sensation", or "force sensation" is imparted as the "presentable modality attribute" among the waypoint information included in the waypoint list.

The output device 20 outputs sound data or outputs a tactile or force sensation based on the information received from the guidance information presentation unit 14. The tactile or force sensation may be output by a tactile display or a force sensation display. Alternatively, a change in gradient may be output using the treadmill or the like. Further, an odor may be output using an olfactory display or the like, or a taste may be output using an electric taste sensation that stimulates a tongue with an electric current to make taste experienced.

An output format of the guidance information may be changed depending on the spatial cognitive characteristics of the user. For example, because it is conceivable that it is necessary to be able to imagine an overall image of the route when information indicating that the user has the spatial cognitive characteristics for forming a survey map type cognitive map in a bird's-eye view is included in the user characteristics information, the guidance information presentation unit 14 may generate guidance information including an image indicating an overall image of the target route in which positions of the nodes or facilities relevant to the waypoint information in which "visual sensation" is included in the "presentable modality attribute" in the waypoint list are plotted, and transmit the guidance information to the output device 20.

On the other hand, when information indicating that the user has the spatial cognitive characteristics for forming a route map type cognitive map in first person point of view is included in the user characteristics information, it is conceivable that it is necessary to be able to imagine what kind of landmarks are on the way through experience. Thus, the guidance information presentation unit 14 may generate, for the target route, guidance information including an image in first person point of view including nodes or facilities relevant to the waypoint information in which "visual sensation", "tactile sensation", and "force sensation" are included in the "presentable modality attribute" in the waypoint list, and transmit the guidance information to the output device 20.

Further, the output format of the guidance information may be changed according to, for example, a way of memorization that the user is good at. For example, when information indicating that the user is good at visually remembering information is included in the user characteristics information, the guidance information presentation unit 14 may preferentially set, for example, an image relevant to waypoint information in which "visual sensation" is included in the "presentable modality attribute" in the waypoint list, as an output target. Further, when information indicating that the user is good at audibly remembering information is included in the user characteristics information, the guidance information presentation unit 14 may preferentially set, for example, a sound relevant to waypoint information in which "hearing sensation" is included in the "presentable modality attribute" in the waypoint list, as an output target. Further, because it is conceivable that it is easier for hearing sensation information to be remembered when information indicating that the user has a synesthesia such as feeling a color in a sound is included in the user characteristics information, the guidance information presentation unit 14 may preferentially set, for example, a sound relevant to waypoint information in which "hearing sensation" is included in the "presentable modality attribute", as an output target.

As described above, according to the present embodiment, a candidate for the sensation to be experienced by the user regarding each node and each facility in the target route (presentable modality attribute) is specified. Thus, it is possible to contribute to generation of guidance information suitable for the user (guidance information according to characteristics of information acquisition or information understanding of the user).

In the present embodiment, the waypoint list generation unit 12 is an example of a first specifying unit and an acquisition unit. The input unit 11 is an example of a reception unit. The presentable modality impartment unit 13 is an example of a second specifying unit. The guidance information presentation unit 14 is an example of a selection unit. The facility information storage unit 122 is an example of a first storage unit. The rule information storage unit 123 is an example of a second storage unit.

The embodiments of the present invention have been described above in detail, but the present invention is not limited to such a specific embodiment, and various modifications and changes can be made without departing from the gist of the present invention described in the claims.

REFERENCE SIGNS LIST

10 Guidance information processing device
11 Input unit
12 Waypoint list generation unit
13 Presentable modality impartment unit
14 Guidance information presentation unit
20 Output device
100 Drive device
101 Recording medium
102 Auxiliary storage device
103 Memory device
104 CPU
105 Interface device
106 Display device
107 Input device
121 Route information storage unit
122 Facility information storage unit
123 Rule information storage unit
B Bus

The invention claimed is:

1. A guidance information processing device comprising:
a memory,
an output device configured to:
display guidance information to a user, and
output at least one designated sensation to be experienced by the user at a time of performing guidance on a route; and
a processor configured to:
refer to a first storage storing position information of each of a plurality of facilities,
specify one or more of the facilities present on the route based on a designation of the user,
receive user characteristics information that includes at least one of types of spatial cognitive characteristics of the user, or ways of memorization that the user is good at,
refer to a second storage storing, for each of the one or more facilities, information indicating a sensation capable of being experienced at each of the one or more facilities,
specify at least two types of candidate sensations from a plurality of types of candidate sensations including hearing sensation, tactile sensation, and force sensation to be experienced by the user at each of the one or more of the specified facilities at the time of performing guidance on the route,
select, from the at least two types of the candidate sensations, at least one type of candidate sensation as the at least one designated sensation to be output by the output device for each of the one or more of the specified facilities based on the user characteristics information,
generate the guidance information to be displayed on the output device, the guidance information including an indication of the at least one designated sensation, and
send an instruction to the output device causing the output device to output the guidance information and the at least one designated sensation,
wherein the processor is further configured send the instruction to the output device to adjust the guidance information and the at least one designated sensation in real time for each of the one or more of the facilities on the route.

2. The guidance information processing device according to claim 1, wherein the processor is further configured to:
receive an input of two points designated by the user,
acquire information in which the route between the two points is expressed by a plurality of nodes and links connecting the plurality of nodes, and
specify the one or more of the facilities with respect to the route relevant to the acquired information.

3. The guidance information processing device according to claim 2,
wherein the processor is further configured to acquire, for each node, information including any one or more of a turning direction, a gradient to a next node, and a floor movement to the next node, and
specify the candidate for the sensation for causing the user to experience the force sensation regarding each node according to the information including the any one or more of the turning direction, the gradient to the next node, and the floor movement to the next node.

4. A computer-implemented guidance information processing method comprising:
referring to a first storage storing position information of individual facilities, and specifying one or more of the facilities present on a route based on a designation of a user,
receiving user characteristics information that includes at least one of types of spatial cognitive characteristics of the user, or ways of memorization that the user is good at,
referring to a second storage storing, for each of the one or more facilities, information indicating a sensation capable of being experienced at each of the one or more facilities,
specifying at least two types of candidate sensations from a plurality of types of candidate sensations including hearing sensation, tactile sensation, and force sensation to be experienced by the user at each of the one of more of the specified facilities at a time of performing guidance on the route,
selecting, from the at least two types of the candidate sensations, at least one type of candidate sensation as at least one designated sensation to be output for each of the one or more of the specified facilities based on the user characteristics information,
generating guidance information to be displayed, the guidance information including an indication of the at least one designated sensation, and
outputting the guidance information and the at least one designated sensation,
wherein the method further comprises sending the instruction to the output device to adjust the guidance information and the at least one designated sensation in real time for each of the one or more of the facilities on the route.

5. A non-transitory computer-readable recording medium having stored therein a program causing a computer to operate as the guidance information processing device according to claim 1.

6. The guidance information processing device according to claim 1,
wherein the designated sensation output by the output device comprises at least one of an odor and a taste.

* * * * *